United States Patent [19]
Uno et al.

[11] Patent Number: 5,131,232
[45] Date of Patent: Jul. 21, 1992

[54] COOLING METHOD

[75] Inventors: Shigeru Uno; Hiroshi Kaneko, both of Mie, Japan

[73] Assignee: Tosoh Corporation, Yamaguchi, Japan

[21] Appl. No.: 586,107

[22] Filed: Sep. 21, 1990

[30] Foreign Application Priority Data

Sep. 28, 1989 [JP] Japan .................. 1-250521

[51] Int. Cl.$^5$ .......................... F25D 25/00
[52] U.S. Cl. .......................... 62/62; 62/99; 62/434
[58] Field of Search .............. 62/62, 434, 99

[56] References Cited

U.S. PATENT DOCUMENTS 2,122,805 7/1938 Wulff et al. ................ 260/2
2,931,192 4/1960 Weinberg .................... 62/434
3,611,739 10/1971 Bonem ........................ 62/79
4,607,494 8/1986 Cipelletti .................... 62/62

FOREIGN PATENT DOCUMENTS 0100430 2/1984 European Pat. Off. .
1138627 1/1969 United Kingdom .
2022454 12/1979 United Kingdom .

Primary Examiner—Ronald C. Capossela
Attorney, Agent, or Firm—Sughrue, Mion, Zinn, Macpeak & Seas

[57] ABSTRACT

A polymerization process is advantageously effected to provide product polymers substantially free of "fish eyes" in a polymerization vessel provided with a cooling jacket and/or cooling pipe system through which a liquefied refrigerant having specific ranges of saturation pressure, saturation temperature and boiling point characteristics is passed and is vaporized during the passage so as to effectively remove the heat of polymerization.

9 Claims, 1 Drawing Sheet

COOLING METHOD

FIELD OF THE INVENTION

This invention relates to a method for cooling substances. In particular, the invention relates to such a method characterized in that substances present in a polymerization vessel are efficiently maintained with a desired range of temperatures by using a refrigerant of specified characteristics.

BACKGROUND OF THE INVENTION

A variety of methods have been proposed for cooling or chilling a substance or substances present in a polymerization vessel. For instance, a polymerization vessel to be used for production of polyvinyl chloride may be provided with a reflux condenser or may be cooled by means of cold water from a chiller. However, in the polymerization process where the reflux condenser is provided for the polymerization vessel, there is a tendency for a vigorous foaming of the contents to occur in the reaction system when cooled by the condenser. In particular, this phenomenon during the initial stage of polymerization results in deposition of bubbles of the initiator-containing dispersion liquor onto the inner surfaces of the gas phase section of the polymerization vessel and of the conduits connected thereto and also onto the inner surfaces of the reflux condenser and eventual formation of undesirable scales there. The thus formed scales may disadvantageously reduce the heat removal efficiency of the reflux condenser and also may present problems of poor quality of the product. For example, generation of "fish eyes" due to detachment of the scales and contamination of the product with debris of the detached scales. A great deal of labor is required for cleaning the polymerization vessel and incidental equipment by removing the deposited scales.

On the other hand, in the polymerization process where cooling of the polymerization vessel is effected by means of chiller water, the operating temperature is restricted within narrow limits so that this cooling technique may be acceptably employed only in the summer but is little effective in the winter. That is, the cooling technique is disadvantageous with respect to the thermal efficiency of the refrigerator used and does not provide a substantial enhancement in the cooling capacity. Further, in the case where the size of the polymerization vessel becomes large, it is well known that the coolng performance is relatively lowered, i.e., the conduction area available for cooling becomes insufficient relative to the heat generated by the polymerization reaction occurring in the large-sized vessel. Therefore, where a substantial magnitude of cooling is desired, a corresponding increase in the heat conductive area is required and hence the structure of the polymerization vessel becomes complicated and the equipment becomes expensive.

SUMMARY OF THE INVENTION

In the above-discussed circumstances of prior art, we have intensively conducted a good deal of study and research to develop an improved method for highly efficiently cooling the contents of polymerization vessels. As a result, we have discovered the fact that the heat of polymerization reaction may be efficiently removed by directly feeding a refrigerant medium maintained at a temperature within a specific range, into a cooling jacket and/or cooling pipe system provided for the polymerizattion vessel. The present invention is based on this discovery.

Accordingly, the invention provides a method for cooling heat generated during polymerization of a substance or substances present in a polymerization vessel by means of a cooling jacket and/or cooling pipe system provided for said vessel, characterized in that a refrigerant medium exhibiting a saturation pressure of 0.1–80 $kg/cm^2$ and a saturation temperature of from $-50°$ C. to $30°$ C. and having a boiling point in the range of from $-130°$ C. to $95°$ C. is cooled down to a temperature of from $-50°$ C. to $30°$ C. and directly fed as such into said cooling jacket and/or cooling pipe system.

BRIEF DESCRIPTION OF THE DRAWING

The FIGURE is a cross-sectional schematic view of a reactor vessel with a cooling pipe and a cooling jacekt according to the present invention.

DESCRIPTION OF THE PREFERRED EMBODIMENT

Figure 1:
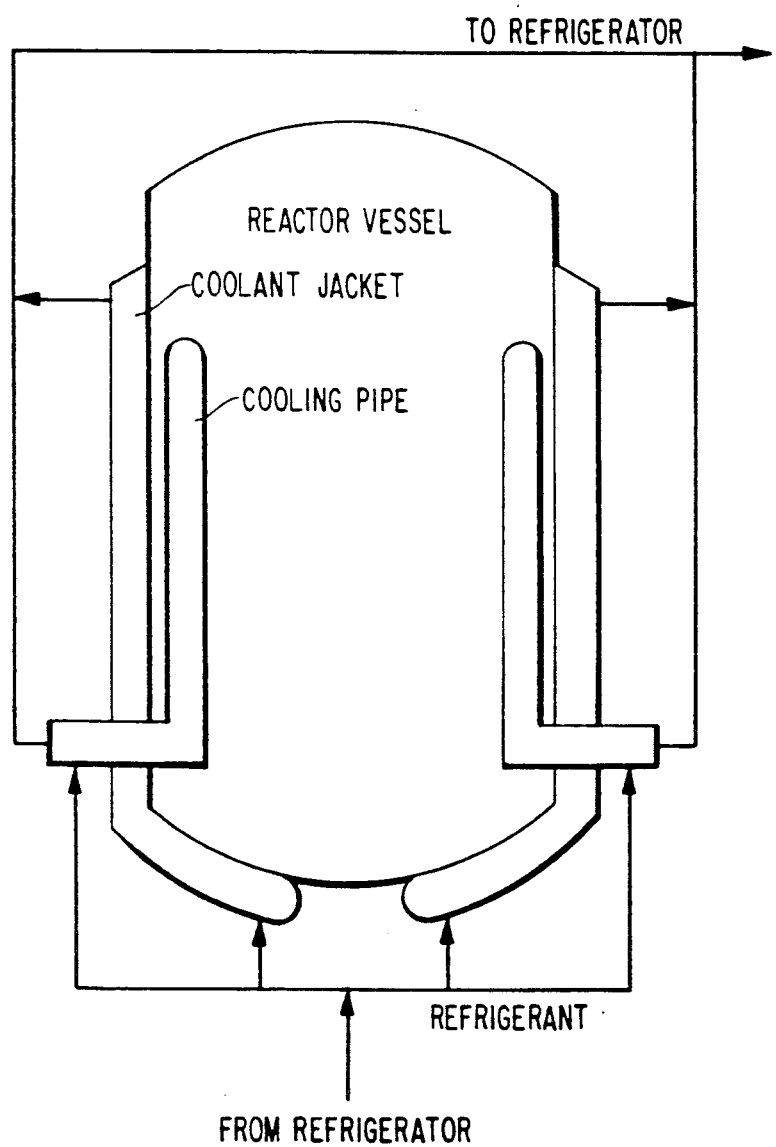

The invention will be described in detail hereinafter.

The polymerization vessel used in the invention may be of any suitable type of conventional polymerization vessels and need not be restricted to a specific type of vessel. For example, a stainless steel vessel, a glass-lined vessel and the like having an internal volume of about 1 to 300 $m^3$ may be mentioned.

The polymerization vessel is provided with a cooling jacket and/or cooling pipe system. The cooling pipe system may be provided within the polymerization vessel. The substance or substances present in the polymerization vessel are not limited to a specific one or one and may comprise and/or be derived from, for example, a vinyl compound such as vinyl chloride, an olefinic compound, and/or other functional compound or compounds.

The type or kind of the process for polymerization the substance or substances present in the vessel is not critical and may be suitbly selected depending on the substance or substances to be polymerized. Of course, in addition to the above-listed substance or substances, any other material that is required or desireed to be used in the selected type of polymerization process may be present in the vessel.

As examples of the polymerizattion processes to which the present invention applies, addition or condensation polymerization processes based on the suspension, emulsion, bulk, gas-phase or solution polymerization technique may be mentioned.

For example, where vinyl chloride is polymerized by the suspension polymerization technique, a mixture comprising 100 parts by weight of vinyl chloride monomer and 80–200 parts by weight of water as a solvent with a polymerization initiator, a dispersant and other additives added thereto may be subjected to polymerization at a temperature of 45°–70° C. The oil-soluble initiator additives well known in the art may be used as polymerization initiator for this purposes. As exemplary oil-soluble initiator additives, may be mentioned: azo compoundds such as azobis-$\alpha,\alpha'$-dimethylvaleronitrile, 2,2'-azobis-2,4-dimethyl-4-methoxyvaleronitrile and the like; and organic peroxides such as di-isopropyl peroxydicarbonate, di-2-ethylhexyl peroxydicarbonate, di-($\beta$-ethoxyethyl)peroxydicarbonate, t-butyl peroxydicarbonate, acetylcyclohexyl sulfonyl peroxide, t-butyl peroxypivalate, lauroyl peroxide and the like.

The dispersant used may be any known one. Examples which mayy be mentioned include stylene--maleic acid copolymer, partially saponified polyvinyl alcohol, methyl cellulose, hydroxypropymethyl cellulose, ethyl cellulose, gelatin, calcium carbonate, calcium phosphate, etc.

The refrigerant medium used in the invention is one that exhibits a saturated pressure of 0.1-80 $kg/cm^2$, preferably 0.3-50 $kg/cm^2$ and a saturation temperature of from $-50°$ C. to $30°$ C., preferably from $-30°$ C. to $15°$ C. and has a boiling point in the range of from $-130°$ C. to $95°$ C. Examples of the refrigerant medium which may be mentioned include halogenated hydrocarbons, saturated hydrocarbons, unsaturated hydrocarbons, ammonia, carbon dioxide, sulfur dioxide, etc. Particular examples of the halogenated hydrocarbon refrigerants which may be mentioned include trichloromonofluoromethane, Flon 11; dichlorodifluoromethane, Flon 12; monochlorodifluoromethane, Flon 22; and the like. Examples of the saturated hydrocarbon refrigerants include methane, propane and the like. Examples of the unsaturated hydrocarbon refrigerants include ethylene, propylene and the like.

The refrigerat medium is cooled and maintained at a temperature of from $-50°$ C. to $30°$ C. outside the polymerization vessel and directly supplied as such into a cooling jacket and/or cooling pipe system attached to the vessel, so that the heat of polymerization reaction may be removed and cooled to a desired extent. The maintenance of the refrigerant at a temperature of from $-50°$ C. to $30°$ C. may be achieved using a common refrigerator apparatus. A typical example of commonly used refrigerators is a vapor compression-type refrigerator. The invention will be described with regard to the principle of refrigeration with such a type of refrigerator.

A liquid refrigerant from the refrigerator is vaporized at a low temperature and a low pressure within a cooling jacket and/or cooling pipe system of a polymerization vessel by the heat of polymerization reaction. The conversion of the refrigerant from the liquid form to the vapor form requires a quantity of latent heat which is compensated by the sensible heat taken up from the substances present in the polymerization vessel. Thus, the substances are correspondingly cooled. The vaporized refrigerant discharged from the cooling jacket and/or cooling pipe system may be compressed by a compressor and then cooled by water to a re-liquefy it. The thus compressed refrigerant is condensed to give a pressurized liquid at ambient temperature. This pressurized liquid is returned to the low-pressure section, i.e. the cooling system of the vessel, where is is vaporized again. The refrigerant is continuously used in the above-outlined cycle. The utilization of the latent heat of vaporization of the refrigerant according to the invention increases the cooling capacity of the cooling system to an approximately double degree as compared with the conventional cooling technique in which the sensible heat of refrigerant is utilized for the cooling purpose. Conventionally used liquid water or chiller water roughly corresponds to the present refrigerant.

The invention is preferably applied to polymerization processes which are carried out at polymerization temperatures in the range of from $-30°$ C. to $300°$ C. In particular, where the invention is applied to production of vinyl chloride resin, it has been found that the product resin has significantly decreased the number of fish eyes.

According to the invention, a liquefied refrigerant is directly fed into a cooling jacket and/or cooling pipe system of a polymerization vessel and is permitted to evaporate while effectively removing the heat of polymerization reaction. Thus, the cooling capacity may be largely increased.

Due to the increased cooling capacity available in the polymerization vessel according to the invention, the polymerization vessel needs to be provided only with a relatively small conduction area for cooling the contents of vessel to a desired level of temperature. The small conduction area provided to the polymerization vessle will enhance the productivity of the process.

Further, where the invention is employed for producing vinyl chloride polymers, the resultinig polymers contain less "fish eyes" as compared with the case where the polymers are produced using the conventional polymerization vessels provided with a reflux condenser cooling system. Furthermore, according to the present invention, the frequency of cleaning of the polymerization vessel by removing the deposited solids from the inner surfaces thereof and the labor required therefor are significantly reduced. Therefore, the invention will be industrially valuable.

EXAMPLE

The invention will be further illustrated with reference to the following non-limiting examples. The powder characteristics of the product resins were determined as follows.

1. Particle Size Distribution

The particle size distribution was determined in accordance with the sieve-retention test method of JIS (Japanese Industrial Standard) K-0069 using a set of the JIS standard sieves.

2. Bulk Density

The bulk density was determined by the test method of JIS K-6721.

3. Fish Eye

A. Formulation

|  | Parts by weight |
| --- | --- |
| Resin | 100 |
| DOP | 50 |
| Ca—Zn stabilizer | 2 |
| Ultramarine | 3 |

B. Evaluation

The above formulation was kneaded at $150°$ C. for 3 minutes in mixing rolls and then formed into a 0.3 mm thick sheet. The number of fish eyes occurring within an area of 50 $cm^2$ of the sheet was counted.

EXAMPLE 1

A stainless steel polymerization vessel provided with a cooling jacket and also a cooling pipe system and having an internal capacity of 1 $m^3$ was chargeed with 50 parts by weight of water and 0.05 parts by weight of a partially saponified polyvinyl alcohol. Then, the air in the vessel was removed by means of vacuum pump. Thereafter, 100 parts by weight of vinyl chloride monomer followed by 0.03 parts by weight of di-2-ethylhexyl peroxydicarbonate was charged to the vessel. The temperature of the mixture was allowed to rise to $57°$ C.

while the mixture was stirred so as to permit the polymerization reaction to start. Prior to the commencement of the polymerization reaction, a refrigerant Flon 22 was adjusted to a saturation pressure of 2.5 kg/cm² at −20° C. and was fed as such into the cooling jacket and the cooling pipe system so as to preliminarily and moderately cool the contents of the vessel. When the temperature in the vessel had risen up to 55° C., the cooling was regularly effected to keep the temperature at the desired level and continued until the internal pressure of the vessel fell by 1 kg/cm² and the unreacted monomer was recovered from the reacted mixture.

After discharging the PVC slurry produced by the polymerization, the interior surfaces of the polymerization vessel were inspected, but there were found no polymeric particles or scales deposited thereon.

The results are shown in Table 1.

EXAMPLE 2

The general procedure as described in Example 1 was repeated except that Flon 22 was adjusted to a saturation pressure of 3.6 kg/cm² at −10° C. instead of the saturation pressure of 2.5 kg/cm² at −20° C.

EXAMPLE 3

The general procedure as described in Example 1 was repeated except that Flon 22 was adjusted to a saturation pressure of 5.1 kg/cm² at 0° C. instead of the saturation pressure of 2.5 kg/cm² at −20° C.

EXAMPLE 4

The general procedure as described in Example 1 was repeated except that Flon 22 was adjusted to a saturation pressure of 7 kg/cm² at 10° C. instead of the saturation pressure of 2.5 kg/cm² at −20° C.

EXAMPLE 5

The general procedure as described in Example 1 was repeated except that Flon 22 was passed only through the cooling jacket at the saturation pressure of 2.5 kg/cm² at −20° C.

EXAMPLE 6

The general procedure as described in Example 1 was repeated except that Flon 11 was used at a saturation pressure of 0.42 kg/cm² at 0° C. in place of Flon 22 that was used at the saturation pressure of 2.5 kg/cm² at −20° C. in Example 1.

COMPARATIVE EXAMPLE 1

The general procedure as described in Example 1 was repeated except that water at 20° C. instead of Flon 22 was passed through the cooling jacket and the cooling pipe system.

COMPARATIVE EXAMPLE 2

The general procedure as described in Example 1 was repeated except that water chilled at 7° C. instead of Flon 22 was passed through the cooling jacket and the cooling pipe system.

COMPARATIVE EXAMPLE 3

The general procedure as described in Example 1 was repeated except that a reflux condenser was provided at the top of the reactor vessell and water at 20° C. was fed through the condenser to effect cooling.

The results of the above Examplees are shown together with the cooling conditions in the Table 1 below.

TABLE 1

|  | Ex. 1 | Ex. 2 | Ex. 3 | Ex. 4 | Ex. 5 |
|---|---|---|---|---|---|
| Refrigerant | Flon 22 | Flon 22 | Flon 22 | Flon 22 | Flon 22 |
| Refrigerant temperature (°C.) | −20 | −10 | 0 | 10 | −20 |
| Refrigerant boiling point (°C.) | −40.8 | −40.8 | −40.8 | −40.8 | −40.8 |
| Cooling unit |  |  |  |  |  |
| Jacket | X | X | X | X | X |
| Pipe | X | X | X | X | — |
| Reflux condenser | — | — | — | — | — |
| Cooling capacity (kcal/hr) | $2.61 \times 10^5$ | $2.28 \times 10^5$ | $1.94 \times 10^5$ | $1.60 \times 10^5$ | $1.96 \times 10^5$ |
| Number of fish eyes occurring in 50 cm² of polymer sheet (on sample prepared by kneading for 3 minutes polymer of the tenth batch) | 6 | 4 | 7 | 3 | 6 |
| Bulk density (g/cc) | 0.541 | 0.538 | 0.535 | 0.541 | 0.537 |
| Resin particle distribution |  |  |  |  |  |
| retained on 60 mesh | 0.1 | 0.3 | 0.1 | 0.2 | 0.1 |
| passed through 100 mesh | 77.4 | 75.1 | 76.1 | 75.5 | 76.9 |
| passed through 250 mesh | 3.8 | 3.2 | 3.7 | 3.4 | 3.7 |

|  | Ex. 6 | Comp. Ex. 1 | Comp. Ex. 2 | Comp Ex. 3 |
|---|---|---|---|---|
| Refrigerant | Flon 11 | Water | Water | Water |
| Refrigerant temperature (°C.) | 0 | 20 | 7 | 20 |
| Refrigerant boiling point (°C.) | 23.8 | 100 | 100 | 100 |
| Cooling unit |  |  |  |  |
| Jacket | X | X | X | — |
| Pipe | X | X | X | — |
| Reflux condenser | — | — | — | X |
| Cooling capacity (kcal/hr) | $1.87 \times 10^4$ | $5.92 \times 10^4$ | $8.00 \times 10^5$ | $1.56 \times 10^4$ |
| Number of fish eyes occurring in 50 cm² of polymer sheet (on sample prepared by kneading for 3 minutes polymer of the tenth batch) | 6 | 5 | 8 | 170 |
| Bulk density (g/cc) | 0.539 | 0.540 | 0.539 | 0.505 |
| Resin particle distribution |  |  |  |  |
| retained on 60 mesh | 0.2 | 0.1 | 0.2 | 16.2 |
| passed through 100 mesh | 75.9 | 77.8 | 76.4 | 19.7 |

TABLE 1-continued

| | | | | |
|---|---|---|---|---|
| passed through 250 mesh | 3.7 | 3.7 | 3.8 | 0.8 |

Note - Resinous formulation used for the fish eye determination:
Resin 100 p.b.w.; DOP 50 p.b.w.
Ca—Zn stabilizer 2 p.b.w.; Ultramarine 3 p.b.w

What is claimed is:

1. A method for cooling a polymerization vessel, comprising the steps of:
   providing a cooling jacket around said vessel;
   providing a cooling pipe within said vessel, and
   circulating a refrigerant medium through said cooling jacket and said cooling pipe, said refrigerant medium exhibiting a saturation pressure of 0.1-80 kg/cm$^2$ and a saturation temperature of from −50° C. to 30° C., having a boiling point in the range of from −130° C. to 95° C., and being cooled down to a temperature of from −50° C. to 30° C.

2. A method as claimed in claim 1 wherein the polymerization is suspension, emulsion, bulk, gas-phase or solution polymerization.

3. A method as claimed in claim 1 wherein at least one vinyl monomer is polymerized.

4. A method as claimed in claim 3 wherein vinyl chloride monomer is polymerized.

5. A method as claimed in claim 1 wherein the refrigerant medium exhibits a saturation pressure of 0.3-50 kg/cm$^2$ and a saturation temperature of from −30° C. to 15° C.

6. A method as claimed in claim 1 wherein the refrigerant medium is selected from the group consisting of halogenated hydrocarbons, saturated hydrocarbons, unsaturated hydrocarbons, ammonia, carbon dioxide and sulfur dioxide.

7. A method as claimed in claim 6 wherein the refrigerant medium is selected from the group consisting of trichloromonofluoromethane, dichlorodifluoromethane, monochlorodifluoromethane, methane, propane, ethylene and propylene.

8. A method as claimed in claim 1 wherein the refrigerant medium which is passed through the cooling jacket and/or cooling pipe system is cooled and compressed to liquefy the medium, which is then reused.

9. A method as claimed in claim 1 which is applied to a polymerization process that is conducted at a polymerization temperature in the range of from −30° C. to 300° C.

* * * * *